US009124804B2

(12) United States Patent
Kaheel et al.

(10) Patent No.: US 9,124,804 B2
(45) Date of Patent: Sep. 1, 2015

(54) USING ACCELEROMETER INFORMATION FOR DETERMINING ORIENTATION OF PICTURES AND VIDEO IMAGES

(75) Inventors: Ayman Kaheel, Cairo (EG); Motaz El-Saban, Cairo (EG); Mahmoud Refaat, Cairo (EG); Ahmed El Arabawy, Cairo (EG); Mostafa El Baradei, Cairo (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 584 days.

(21) Appl. No.: 12/729,177

(22) Filed: Mar. 22, 2010

(65) Prior Publication Data

US 2011/0228112 A1    Sep. 22, 2011

(51) Int. Cl.
*H04N 5/228* (2006.01)
*H04N 5/232* (2006.01)
*H04N 1/00* (2006.01)
*H04N 5/76* (2006.01)

(52) U.S. Cl.
CPC ....... *H04N 5/23248* (2013.01); *H04N 1/00127* (2013.01); *H04N 1/00323* (2013.01); *H04N 5/23258* (2013.01); *H04N 5/23267* (2013.01); *H04N 2201/0084* (2013.01); *H04N 2201/3254* (2013.01); *H04N 2201/3277* (2013.01); *H04N 2201/3278* (2013.01)

(58) Field of Classification Search
USPC ................ 348/208.2, 222.1, 231.3
See application file for complete search history.

(56) References Cited

U.S. PATENT DOCUMENTS

| 6,084,594 | A  |   | 7/2000  | Goto |
|-----------|----|---|---------|------|
| 6,100,925 | A  |   | 8/2000  | Rosser |
| 7,369,872 | B2 |   | 5/2008  | Lee |
| 7,554,578 | B2 | * | 6/2009  | Molgaard .................. 348/231.3 |
| 7,689,107 | B2 | * | 3/2010  | Enomoto ........................ 396/53 |
| 7,859,553 | B2 | * | 12/2010 | Bae ............... 345/659 |
| 7,916,184 | B2 | * | 3/2011  | Utagawa et al. ........... 348/231.6 |
| 7,982,770 | B1 | * | 7/2011  | Kahn et al. ................. 348/208.1 |
| 8,094,204 | B2 | * | 1/2012  | Tsurumi .................... 348/222.1 |
| 8,159,541 | B2 | * | 4/2012  | Mcleod ...................... 348/208.2 |
| 8,238,671 | B1 | * | 8/2012  | Babenko et al. .............. 382/224 |
| 8,687,070 | B2 |   | 4/2014  | Chen et al. |
| 2004/0212699 | A1 |  | 10/2004 | Molgaard |

(Continued)

OTHER PUBLICATIONS

Eden et al., "Seamless Image Stitching of Scenes with Large Motions and Exposure Differences," IEEE Computer Vision and Pattern Recognition (CVPR 2006), 8 pages (Jun. 2006).

(Continued)

*Primary Examiner* — Ngoc-Yen Vu
(74) *Attorney, Agent, or Firm* — Brandon Roper; Judy Yee; Micky Minhas

(57) ABSTRACT

A computing device, such as a mobile device, can capture pictures or video images using a digital camera and obtain associated orientation information using an accelerometer. The orientation information can be used to adjust one or more of the captured pictures or video images to compensate for rotation in one or more planes of rotation. The orientation information can be saved along with the captured pictures or video images. The orientation information can also be transmitted or streamed along with the captured pictures or video images. Image matching operations can be performed using pictures or video images that have been adjusted using orientation information.

15 Claims, 8 Drawing Sheets

(56) References Cited

U.S. PATENT DOCUMENTS

| | | | |
|---|---|---|---|
| 2005/0251741 A1 | 11/2005 | Pilu | |
| 2007/0296820 A1* | 12/2007 | Lonn | 348/207.99 |
| 2008/0261572 A1 | 10/2008 | Tsui | |
| 2009/0273699 A1 | 11/2009 | Lin | |
| 2010/0069115 A1* | 3/2010 | Liu | 455/556.1 |
| 2011/0018990 A1* | 1/2011 | Komoto et al. | 348/116 |
| 2011/0242394 A1* | 10/2011 | Ohdate | 348/333.02 |

OTHER PUBLICATIONS

Notice on the First Office Action, China Patent App. No. 201110079470.8, May 6, 2013, 11 pages (w/partial English translation).

"Office Action Received in China Patent Application No. 201110079470.8", Mailed Date: Jun. 24, 2014, 8 Pages.

"Second Office Action Received for China Patent Application No. 201110079470.8", Mailed Date: Dec. 17, 2013, 9 Pages.

* cited by examiner

USING ACCELEROMETER INFORMATION FOR DETERMINING ORIENTATION OF PICTURES AND VIDEO IMAGES

BACKGROUND

Mobile devices that incorporate digital camera and position sensing technology are becoming increasingly common. Because such mobile devices can be rotated in an arbitrary direction when capturing pictures or videos, there is a lack of uniformity in orientation of the pictures or video images when the pictures or videos are stored on the device. For example, a user may take a picture with the mobile device rotated slightly to the right or left. Sometimes such rotation is intentional (it represents the desired picture composition), but sometimes it is not. Regardless of whether the rotation is intentional, the user may want to adjust the picture later. Rotation of pictures or images is typically a manual process (such as with a photo editing application), and can be difficult and imprecise.

Differences in orientation between pictures or video images can be problematic when performing common image processing tasks. For example, when comparing a picture with one or more other pictures, differences in orientation, such as rotation, can increase the difficulty of finding matching pictures or matching features within the pictures. Similarly, when matching features between two or more pictures during stitching of the pictures into a mosaic or panoramic view, differences in orientation can make the task much more difficult to perform successfully and accurately.

Therefore, there exists ample opportunity for improvement in technologies related to picture and image capture and processing using orientation information.

SUMMARY

A variety of technologies related to picture and image capture and processing using orientation information can be applied.

For example, a method for capturing and processing video data is provided. The method includes, for each of multiple video images, obtaining orientation information of a computing device capturing the video image, and adjusting the captured video image based on the orientation information, which indicates the orientation of the computing device at the time of capture of the video image. The adjusted captured video images can be displayed (e.g., in real-time during video capture, or at a later time). The orientation information can be captured with a three-axis accelerometer. In some implementations, the orientation information includes three values: acceleration in the x-axis, acceleration in the y-axis, and acceleration in the z-axis of the computing device performing the capture.

As another example, a mobile device for capturing and processing video data is provided. The mobile device includes a three-axis accelerometer, storage, a digital camera, and a processing unit. The mobile device is configured to, for each of multiple video images, obtain orientation information that indicates the orientation of the mobile device at the time of capturing the video image, and store the captured video and associated orientation information. The associated orientation information can be stored in the same file or different files from the capture video images, and can be stored as acceleration values, rotation angle values or values in another representation. In some scenarios, the orientation information and video image data (with or without adjustment according to the orientation information) are streamed from the mobile device to a network server.

Alternatively, a two-axis accelerometer can be used (e.g., instead of a three-axis accelerometer) to capture orientation information (e.g., acceleration values in two axes), which can be used to determine, and compensate for, rotation in one plane.

As another example, a method for matching image data is provided. The method includes obtaining image data and associated orientation information for a first image captured by a digital camera and obtaining image data and associated orientation information for a second image captured by the digital camera. The orientation information can, for example, represent three-axis accelerometer information obtained during image capture. Then, at least one of the first and second captured images is adjusted using the orientation information to compensate for differences in orientation of the digital camera along at least one plane of rotation. Image matching is performed by matching interest points between the first and second images, as adjusted.

The foregoing and other features and advantages of the invention will become more apparent from the following detailed description, which proceeds with reference to the accompanying figures.

DETAILED DESCRIPTION OF EXEMPLARY EMBODIMENTS

The following description is directed to techniques and solutions for image processing using orientation information. The various techniques and solutions can be used in combination or independently. Different embodiments can implement one or more of the described techniques and solutions.

I. Example Orientation Information

In the techniques and solutions described herein, orientation information is used for various image processing tasks. As used herein, orientation information refers to information capable of describing the orientation of a device, such as a mobile device. For example, orientation information includes information capable of describing the rotation of the device in at least one plane.

In some implementations, orientation information is obtained from a three-axis accelerometer (sometimes called a g-sensor). A three-axis accelerometer provides three values, each value representing acceleration along a different axis. Specifically, a three-axis accelerometer provides a value representing acceleration along the x-axis, a value representing acceleration along the y-axis, and a value representing acceleration along the z-axis. By convention, the values returned by the accelerometer are in units of m/s$^2$ (with a value of approximately 9.80665 m/s$^2$ being equal to one gravity, or 1 g). As used herein, the terms "ax," "ay," and "az" refer to the acceleration values obtained from a three-axis accelerometer in respective x-axis, y-axis, and z-axis directions.

In some implementations, orientation information comprises the three acceleration values (ax, ay, and az) obtained from a three-axis accelerometer. In other implementations, orientation information comprises values calculated from the acceleration values (e.g., degree of left/right roll and/or degree of forward/backward pitch). In yet other implementations, only two-axis acceleration values are obtained (e.g., just ax and ay or just az and ay), which can be used to determine rotation in one plane (e.g., just left/right roll or just forward/backward pitch).

Figure 3:
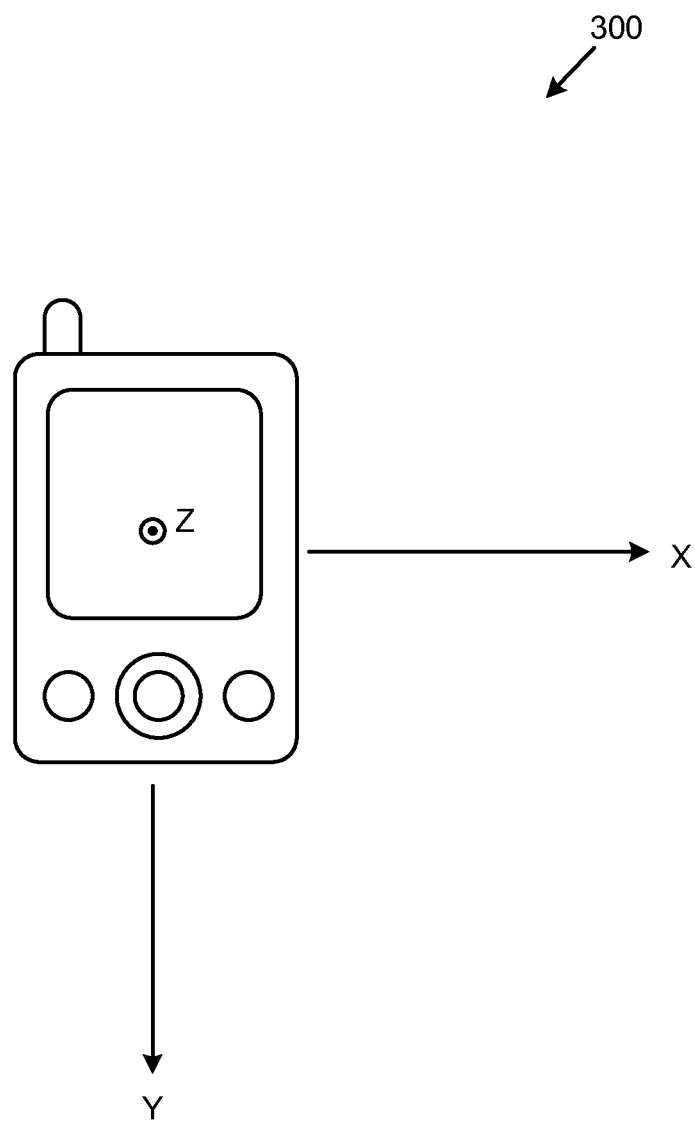
FIG. 3 is a diagram showing an example mobile device comprising an accelerometer, where the mobile device is generally aligned with a plane defined by an X axis and Y axis, and perpendicular to a Z axis.

FIG. 3 is a diagram showing an example mobile device 300 comprising an accelerometer. The accelerometer provides orientation information describing the orientation of the mobile device 300. With a three-axis accelerometer, orientation information can be obtained for the x, y, and z-axis. The position of the accelerometer in the mobile device 300 will determine the direction of each axis. In the example mobile device 300, the accelerometer has been oriented such that the y-axis of the accelerometer points down (toward the earth) when the mobile device 300 is held upright and level. The x-axis extends left and right from the mobile device 300, and the z-axis extends forward and backward from the mobile device 300. The accelerometer can be oriented differently in the device (e.g., with the z-axis pointing down when the device is held upright and level), which will require corresponding changes to the axes used for the various operations described herein.

When the mobile device 300 is oriented upright and level (as depicted in the figure), the three-axis accelerometer will provide values of approximately 9.80665 m/s$^2$ for the y-axis, 0.0 m/s$^2$ for the x-axis (representing zero degrees left-right roll), and 0.0 m/s$^2$ for the z-axis (representing zero degrees forward-backward pitch). If the mobile device 300 is rotated slightly to the right, then the y-axis acceleration value will decrease and the x-axis acceleration value will increase, indicating rotation in the (y,x) plane (if the device 300 is not rotated forward or backward, then the z-axis value will remain unchanged). Similarly, if the mobile device 300 is rotated slightly forward, then the y-axis acceleration value will decrease and the z-axis value will increase, indicating rotation in the (y,z) plane (if the device 300 is not rotated left or right, then the x-axis value will remain unchanged). Combinations of rotation left/right and forward/backward will result in corresponding changes in x, y, and z-axis acceleration values. However, regardless of how the device is rotated, the magnitude of the vector (ax, ay, az) will theoretically be 9.80665 m/s$^2$ (when the device is still or at constant velocity).

The mobile device 300 can be any type of mobile computing device. For example, the mobile device 300 can be a mobile phone, personal digital assistant (PDA), smart phone, tablet computer, laptop computer, digital camera, digital video recorder, and the like. While FIG. 3 depicts a mobile device 300, the techniques and solutions described herein are not limited to mobile devices. Generally, any type of computing device that includes an accelerometer and an imaging device (e.g., digital camera and/or video camera), can implement the techniques and solutions described herein. For example, a desktop computer with an accelerometer and an integrated webcam (or an attached webcam having an accelerometer) can obtain orientation information during capture of pictures or video images.

II. Example Associating Orientation Information

In the techniques and solutions described herein, orientation information can be associated with still pictures and video images. When a picture or video image is captured, orientation information of the device performing the capture (e.g., mobile device or another type of computing device) can be obtained and associated with the captured picture or video image. For example, orientation information is saved in the same file as a picture or video (e.g., in a header of the picture or video) or it is saved in a separate file associated with the picture or video file.

For example, a smart phone with a camera and an accelerometer is used to take a still picture. When the picture is taken, orientation information from the accelerometer is obtained and associated with the captured picture. The orientation information describes the orientation of the smart phone at the time the picture was taken. In a specific implementation, orientation information (e.g., ax, ay, and az values obtained from a three-axis accelerometer) for still pictures is saved in an IPTC header of the picture file according to the Information Interchange Model (IIM) (the IIM model is provided by the International Press Telecommunications Council (IPTC)). Alternatively, the orientation information is stored in a separate metadata file.

In another example, a smart phone with a camera (that supports video capture) and an accelerometer is used to record video. While the video is being recorded, orientation information from the accelerometer is obtained and associated with each individual video image (e.g., each individual video frame or field) being captured. The orientation information describes the orientation of the smart phone during capture of each individual video image. The orientation information can be saved in a file along with the video images, or in a separate associated file (e.g., containing information associating each captured set of orientation information values, such as ax, ay, and az values, with their respective video image). In addition to, or instead of, saving the video images and orientation information, the video images and orientation information can be streamed from the smart phone to one or more destinations (e.g., to a network server for storage or to another device for display).

In a specific implementation, video images and orientation information are streamed using the Real-time Transport Protocol (RTP). Specifically, the original (un-adjusted) video images, along with the orientation information, are stored in the payload field of the RTP protocol and transmitted to one or more destinations (e.g., network servers or other devices). Alternatively, the orientation information can be inserted in a header field. At the destination, the image data and orientation information are extracted. The orientation information can be used, at the destination, to adjust the video image. Alternatively, video images can be adjusted using the orientation information prior to streaming the video images (orientation information can still be sent with the adjusted video images).

III. Example Calculation of Rotational Angles

Using a three-axis accelerometer, rotational angles can be calculated for both left/right roll and forward/backward pitch of the device. Using the orientation depicted in FIG. 3, the rotational angle in the (y,x) plane (the left/right roll of the device) is denoted $\alpha$. The rotational angle in the (y,z) plane (the forward/backward pitch of the device) is denoted $\beta$.

In a specific implementation, the rotational angles are determined by calculating the 3D rotational transformation between the vector representing the gravitational acceleration (0, |y|, 0) and the vector generated by the accelerometer values (ax, ay, az). The value of |y| is theoretically 9.80665. However, due to accelerometer imperfections, for purposes of calibration the value of |y| is calculated as sqrt($ax^2+ay^2+az^2$). The 3D transformation is calculated using the following equation:

$$\begin{pmatrix} ax \\ ay \\ az \end{pmatrix} = \begin{pmatrix} \cos\alpha & \sin\alpha\cos\beta & -\sin\alpha\sin\beta \\ -\sin\alpha & \cos\alpha\cos\beta & -\cos\alpha\sin\beta \\ 0 & \sin\beta & \cos\beta \end{pmatrix} \begin{pmatrix} 0 \\ |y| \\ 0 \end{pmatrix}$$

Using the above 3D transformation, the rotational angles α and β can be directly calculated.

IV. Example Compensation for Rotation

Once the rotational angles have been calculated (the values for α and β above), captured pictures or video images can be adjusted to compensate for the device rotation. Compensation can be performed for only one plane (e.g., just for α, representing roll), or for both planes (considering roll and pitch).

The compensation can be performed to return any given picture or image to a reference orientation. The reference orientation indicates the orientation of the device and may indirectly indicate the orientation of a reference picture or video image. The reference orientation can be any desired orientation, and depends on what is needed for the particular situation. For example, the reference orientation could be an α value of zero degrees and a β value of zero degrees, representing an upright/level orientation of the device which captured the picture or image or is deemed desirable for image capture. As another example, the reference orientation could be a α value of 90 degrees.

For example, if a picture or video image is captured with orientation information indicating a roll of 20 degrees to the right (an α value of 20 degrees), then the picture or video image can be adjusted for a left 20 degrees change in orientation, to return the picture or image to a reference orientation (the reference orientation being an α value of zero degrees).

As another example, the reference orientation could be the orientation of the computing device when an initial image in a video sequence is captured. So, if an initial video image in a sequence is captured with orientation information indicating a roll of 5 degrees to the left, and a subsequent video image is captured with orientation information indicating a roll of 8 degrees to the left, the subsequent video image is adjusted for a right 3 degrees change in orientation, to return the image to the reference orientation.

The transformations applied to the pictures or video images to compensate for differences in device orientation depend on implementation. In some implementations, the device uses affine transformations to perform rotation, translation, scaling and/or shear operations when compensating for differences in device orientation. For example, the parameters of the transform are set depending on the rotation angles α and/or β.

V. Example Methods for Capturing Video Images

Figure 1:
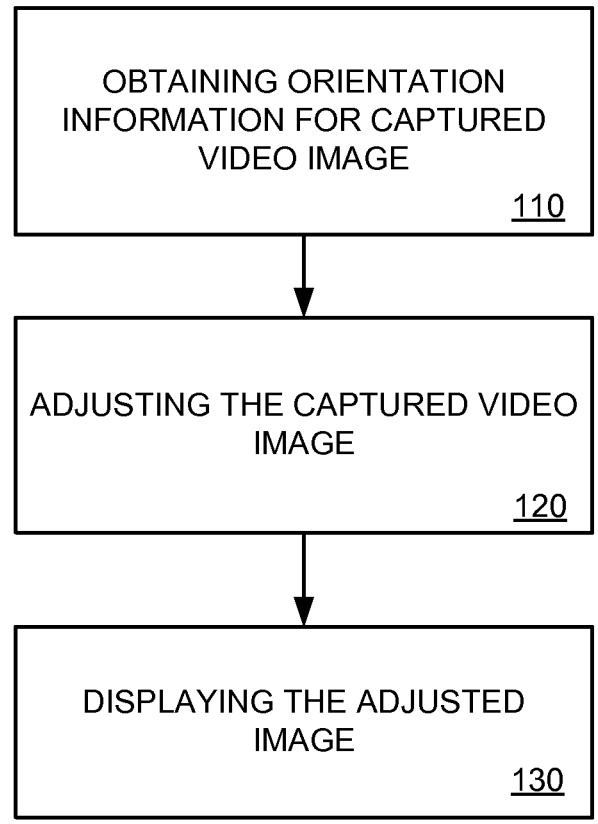
FIG. 1 is a flowchart showing an exemplary method for capturing and processing video data for display using orientation information.

FIG. 1 shows an exemplary method 100 for capturing and processing video data using orientation information. At 110, orientation information is obtained for a captured video image (i.e., orientation information is obtained that is at least roughly contemporaneous with the capture video image). For example, the orientation information comprises ax, ay, and az values from a three-axis accelerometer.

At 120, the captured video image is adjusted using the orientation information. For example, the 3D transformation described above can be used to determine the rotational angle of the captured video image in one or two planes (e.g., just roll or both roll and pitch). From the rotational angle(s), the captured video image can be adjusted. For example, if the captured video image is captured at a 10 degree right roll (rotation in the (y,x) plane using the orientation depicted in FIG. 3), then the captured video image can be rotated left 10 degrees to compensate (to return the captured image to a reference orientation of zero degrees left/right roll). The captured video image can also be adjusted for forward/backward pitch in addition to, or instead of, adjusting for roll. For example, the captured video image is warped by an affine transformation (for image translation, scaling, rotation and/or shear) or perspective transformation.

In a specific implementation, compensation for roll and pitch is performed as follows, using the values of α and β obtained from the calculation in "III. Example Calculation of Rotational Angles" above. First, the picture or image is adjusted using the angle in the (y,x) plane (roll) using a 2×2 rotation matrix, with the general form:

$$\begin{bmatrix} \cos(\alpha) & -\sin(\alpha) \\ \sin(\alpha) & \cos(\alpha) \end{bmatrix}$$

Second, once roll has been adjusted, compensation is performed for pitch using the value of β. Specifically, the x-value of the picture or image remains the same and the y-value is multiplied by cos(β).

At 130, the adjusted captured image is displayed. For example, the adjusted captured image can be output for display by the same device (e.g., a smart phone) that captured the image, or the adjusted captured image can be output from the capture device for display by another device (e.g., transmitted from the smart phone to another device or to a server).

The example method 100 can be performed for each of a number of video images. For example, the example method 100 is performed for each video image captured during video recording. The example method 100 can be performed in real-time during video recording. For example, the orientation information for one video image is obtained 110, then the image is adjusted 120 and displayed 130 as the video for the next image is being captured (e.g., allowing a user to view the adjusted video images in real-time during video capture).

Figure 2:
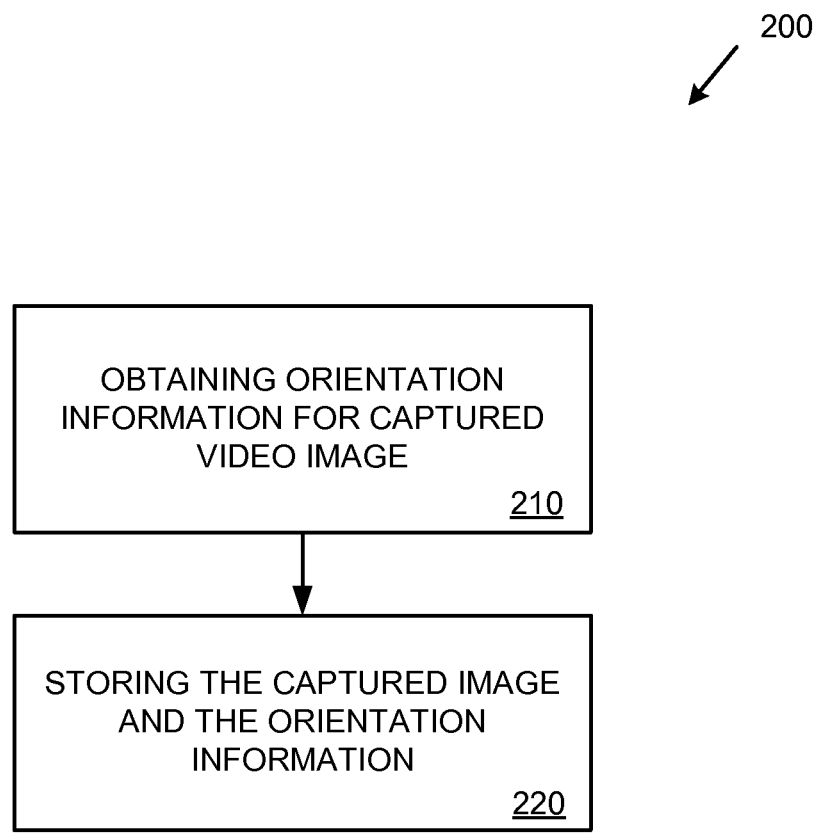
FIG. 2 is a flowchart showing an exemplary method for capturing and storing video data using orientation information.

FIG. 2 shows an exemplary method 200 for capturing and storing video data using orientation information. At 210, orientation information is obtained for a captured video image (i.e., orientation information is obtained that is at least roughly contemporaneous with the captured video image). For example, the orientation information comprises ax, ay, and az values from a three-axis accelerometer.

At 220, the captured video image is stored along with its associated orientation information. For example, the orientation information is saved in the same file as the captured video information (e.g., in a header of an image file or structure), or the orientation information is saved in a separate file associated with the video image file.

The example method 200 can be performed for each of a number of video images. For example, the example method 200 is performed for each video image captured during video recording. The example method 200 can be performed in real-time during video recording. For example, the orientation information for one video image is obtained 210, then stored along with the captured video image 220 as the subsequent video is being captured.

Captured video images can be adjusted at the time of ongoing capture of other images (e.g., in real-time) or later (e.g., using saved orientation information and saved video images). Adjusting video images using orientation information can include compensating for rotation of the video image as compared to a reference orientation. For example, the reference orientation can be an upright/level orientation as depicted in FIG. 3 (where ay=9.80665, ax=0.0, and az=0.0). Compensation for rotation can be performed in one or two planes (e.g., for roll in the (y,x) plane depicted in FIG. 3 and/or for pitch in the (y,z) plane depicted in FIG. 3). For example, compensating for rotation for each plane can be performed by calculating rotation angle in the plane, determining the difference in rotation angle between the calculated rotation angle and the reference rotation angle, and adjusting the captured video image to compensate for the rotation (e.g., to return the captured video image to the reference rotation angle).

VI. Example Mobile Device

In the techniques and solutions described herein, a mobile device can be used to capture pictures and/or video images, and capture associated orientation information. The mobile device can also perform other operations based on the captured pictures/images and associated orientation information, such as adjusting the pictures or images to compensate for rotation, saving the original and/or adjusted pictures or images, saving orientation information, streaming original and/or adjusted pictures or images, and streaming orientation information.

A mobile device can be any type of mobile computing device. For example, the mobile device can be a mobile phone, personal digital assistant (PDA), smart phone, tablet computer, laptop computer, digital camera, digital video recorder, etc. Furthermore, a computing device that is typically not considered "mobile" (such as a desktop computer) can also implement the technologies and solutions described herein (e.g., a desktop computer with a build-in video camera and an accelerometer or with a Web cam having an accelerometer).

Figure 4:
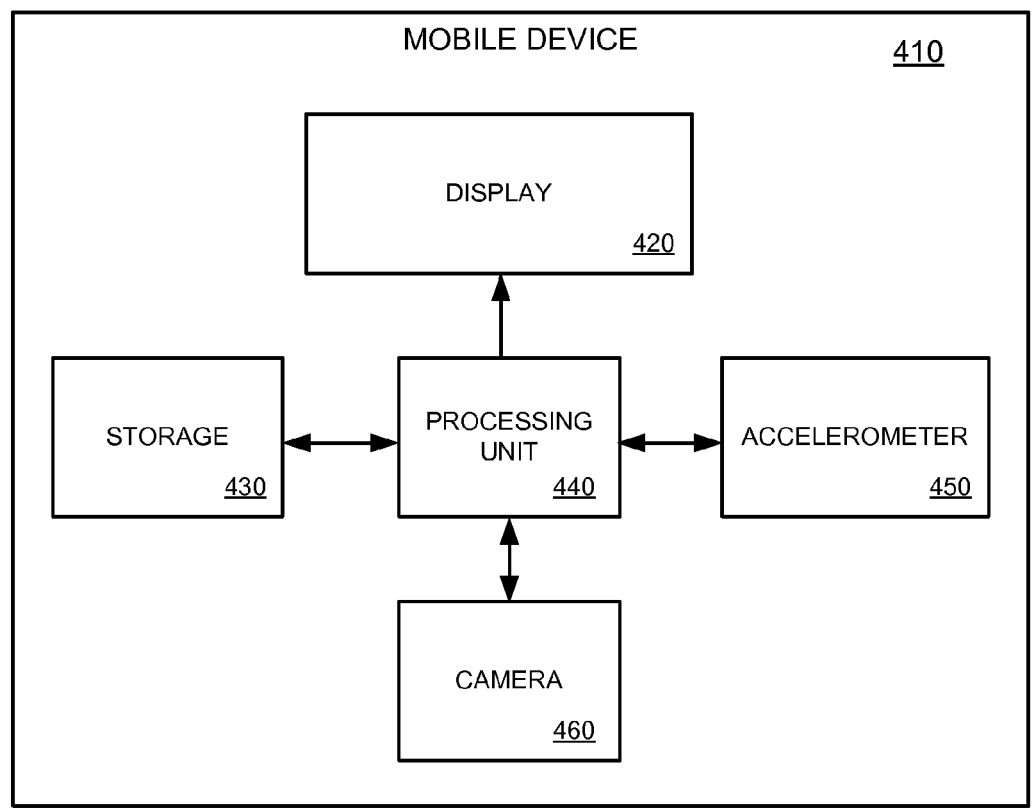
FIG. 4 is a block diagram showing an example mobile device comprising an accelerometer.

FIG. 4 is a block diagram showing an example mobile device 410 capable of capturing pictures and/or images along with associated orientation information. The mobile device 410 comprises a display 420, storage 430, a processing unit 440, an accelerometer 450, and a digital camera 460.

The processing unit 440 can be configured to read orientation information from the accelerometer 450. For example, if the accelerometer 450 is a three-axis accelerometer, then the processing unit 440 reads ax, ay, and az values from the accelerometer 450 at the time an image is captured using the camera (i.e., roughly contemporaneously, such that the obtained orientation information accurately represents the time of capture for the image as compared to the times of capture for other images). The processing unit 440 can save the orientation information and the captured picture or image in the storage 430.

The processing unit 440 can adjust captured pictures or images using the orientation information and cause display of the adjusted captured pictures or images on the display 420. The processing unit 440 can also transmit or stream original or adjusted pictures or images (e.g., using a wireless data network component, not pictured, such as a WiFi transceiver or mobile data network transceiver).

VII. Example Image Matching

The techniques and solutions described herein can be used to match pictures and video images. For example, orientation information can be used to facilitate the task of matching features or interest points in pictures and video images.

When orientation information is not available for a picture or image, image matching can be difficult and computationally expensive. For example, if two pictures are not known to have the same orientation (e.g., the same roll—rotation in the (y,x) plane as depicted in FIG. 3), then special types of descriptors are needed when comparing interest points that can operate regardless of such rotation. However, these special types of descriptors are more computationally expensive than simple descriptors and can be prone to numerical inaccuracies in some cases. An example of a type of rotation-invariant interest point descriptor is the Speeded Up Robust Features (SURF) descriptor.

Using the techniques and solutions described herein, pictures and images can be adjusted to compensate for device rotation before performing imaging matching tasks. For example, two or more pictures or images can be adjusted to compensate for device rotation (e.g., in the (y,x) and/or (y,z) plane as depicted in FIG. 3) using orientation information (e.g., ax, ay, and az values). Once the pictures/images have been adjusted, features or interest points can be selected in a first picture or image and compared to potentially matching features or interest points in one or more other pictures or images. Because the pictures or images have been adjusted to compensate for differences in device orientation (in one or two planes of rotation), interest point matching can be performed using relatively simple pixel comparison operations (assuming images are at the same scale, otherwise compensation for scale/zoom differences may need to be performed), which are less prone to numerical errors and less computationally expensive than operations involving the rotation-invariant descriptors discussed above.

Image matching using orientation information can help improve efficiency and accuracy in a number of areas. For example, pictures or images in a library or database of pictures or images can be adjusted to compensate for device rotation using orientation information to facilitate searching for features or interest points. As another example, pictures or images can be adjusted to compensate for device rotation to facilitate stitching or joining two or more pictures together (e.g., to create a panoramic picture or image).

Figure 5:
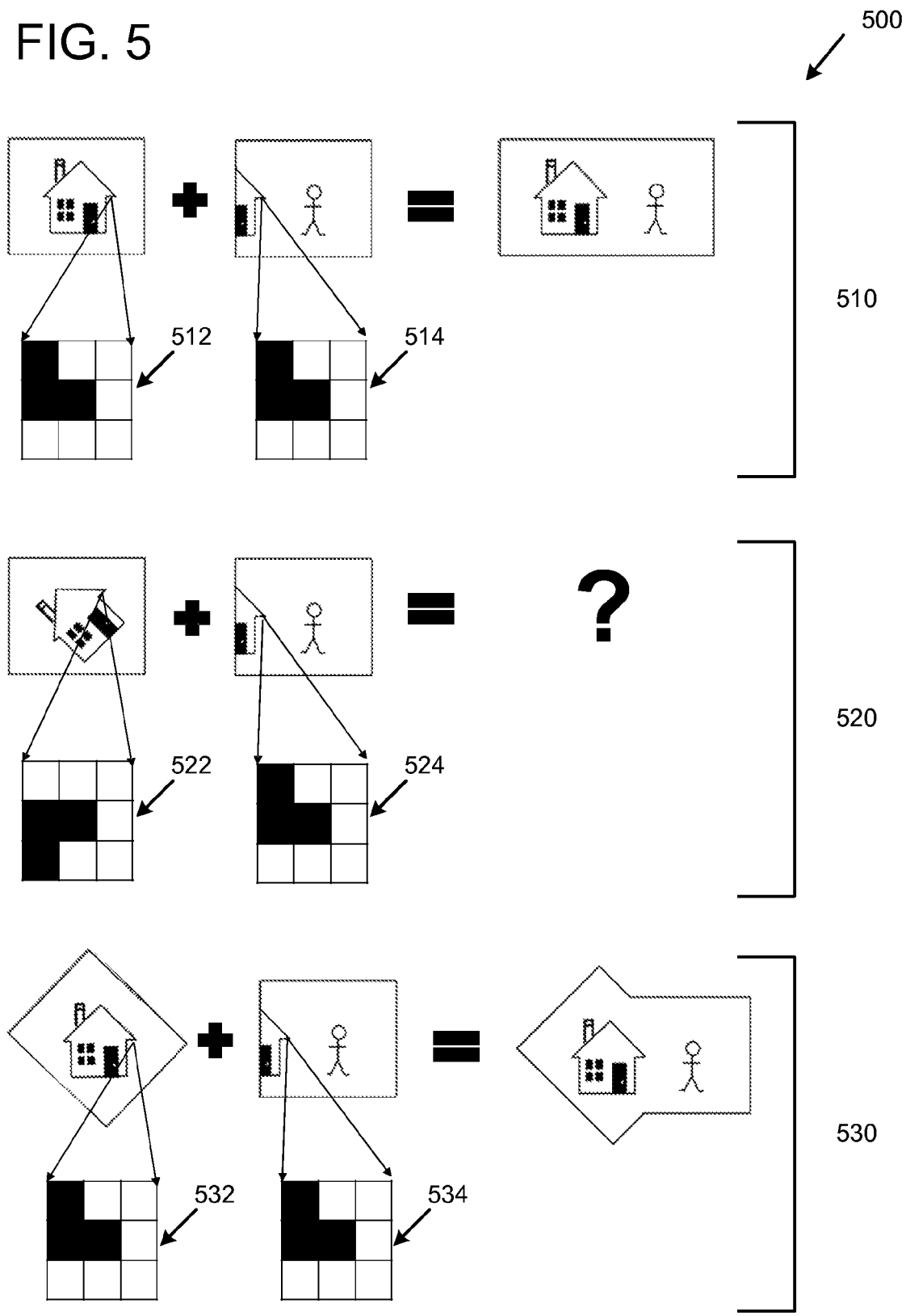
FIG. 5 is a diagram showing example image matching operations using orientation information.

FIG. 5 is an example diagram 500 illustrating how image matching and stitching can be performed using orientation information. The matching example depicted at 510 shows two pictures (which could also be individual video images) to be matched. The two pictures (the left-hand and middle pictures) depicted at 510 were captured with the same device orientation with respect to left-right rotation (roll). In order to match the two pictures, an interest point is selected in the first picture (depicted as a 9×9 grid of pixels at 512). The selected interest point in the first picture 512 is used to find a matching interest point in the second picture (depicted as a 9×9 grid of pixels at 514). Because the two pictures have the same orientation, relatively simple pixel matching operations can be used when matching the interest points 512 and 514. In this example 510, the two images are then stitched (or joined) together based on the matched interest points 512 and 514 (and possibly other matched interest points) to create a single stitched picture (the right-hand picture).

The matching example depicted at 520 also shows two pictures (which could also be individual video images) to be matched. The first (left-hand) picture depicted at 520 has been captured with the camera rotated (rolled) approximately 45 degrees. The first picture depicted at 520 has not been adjusted to compensate for the device rotation. The second (middle) picture depicted at 520 has been captured with the camera level (no roll). As a result, in order to match an interest point in the first picture depicted in 520 with the second picture depicted in 520, a rotation-invariant interest point descriptor needs to be used (as illustrated by the 9×9 pixel grids at 522 and 524). This is a less accurate and more computationally expensive operation than the pixel matching of example 510 (as illustrated by the question mark in 520, indicating that it may be difficult or impossible to match the interest points or create a stitched image).

The matching example depicted at 530 shows two pictures (which could also be individual video images) to be matched. The first (left-hand) picture depicted at 530 has been captured with the camera rotated (rolled) approximately 45 degrees. However, unlike the corresponding first picture depicted at 520, the first picture in 530 has been adjusted to compensate for the device rotation based on orientation information. Because the first and second (middle) picture at 530 effectively have the same device orientation, interest points can be more accurately and efficiently matched (as depicted in the interest point pixel grids 532 and 534). For example, the interest points can be matched using simple pixel matching operations instead of the less accurate and more computationally expensive rotation-invariant descriptors needed for matching in 520. By matching interest points in the first and second pictures in 530, the first and second pictures can be stitched together to create the third (right-hand) image in 530.

VIII. Example Methods for Image Matching

Figure 6:
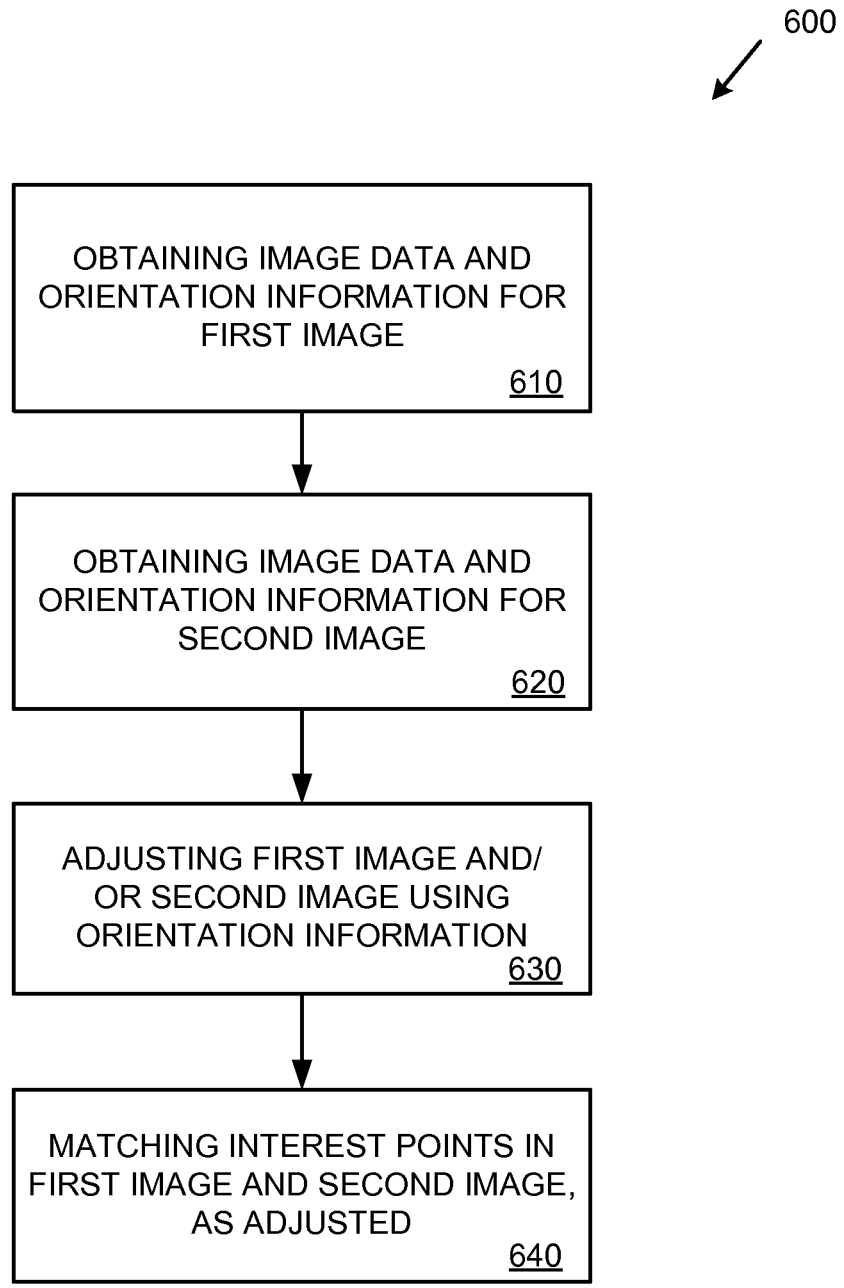
FIG. 6 is a flowchart showing an exemplary method for matching image data using orientation information.

FIG. 6 shows an exemplary method 600 for matching image data using orientation information. The matched image data can include still picture data and video image data. A computing device that captures pictures or images can perform the matching, or a computing device can perform the method using orientation information and image data received from another computing device or camera.

At 610, image data and associated orientation information (e.g., ax, ay, and az values) is obtained for a first captured image. At 620, image data and associated orientation information is obtained for a second captured image. In a specific implementation, orientation information for the first and second images comprises three-axis accelerometer information obtained during image capture.

At 630, at least one of the first and second captured images is adjusted, using the orientation information, to compensate for differences in camera orientation in at least one plane of rotation. For example, both images are adjusted to compensate for differences in camera orientation in the (y,x) plane (as depicted in FIG. 3) and/or both images are adjusted to compensate for differences in camera orientation in the (y,z) plane (as depicted in FIG. 3). In order to adjust both images to have, in effect, the same capture orientation, one or both images can be adjusted with respect to a reference camera orientation in at least one plane of rotation.

At 640, at least one interest point is matched between the first and second captured images, as adjusted. For example, simple pixel matching operations can be used when matching interest points when the pictures have, in effect, the same camera orientation.

Various results can be provided (e.g., output) by the example method 600. For example, an indication of whether an interest point was matched between the first and second images can be output (e.g., displayed). The results can also be used to perform other tasks, such as image stitching, in which case a stitched (or panoramic) image can be output (e.g., displayed or saved).

IX. Example Mobile Device Detail

Figure 7:
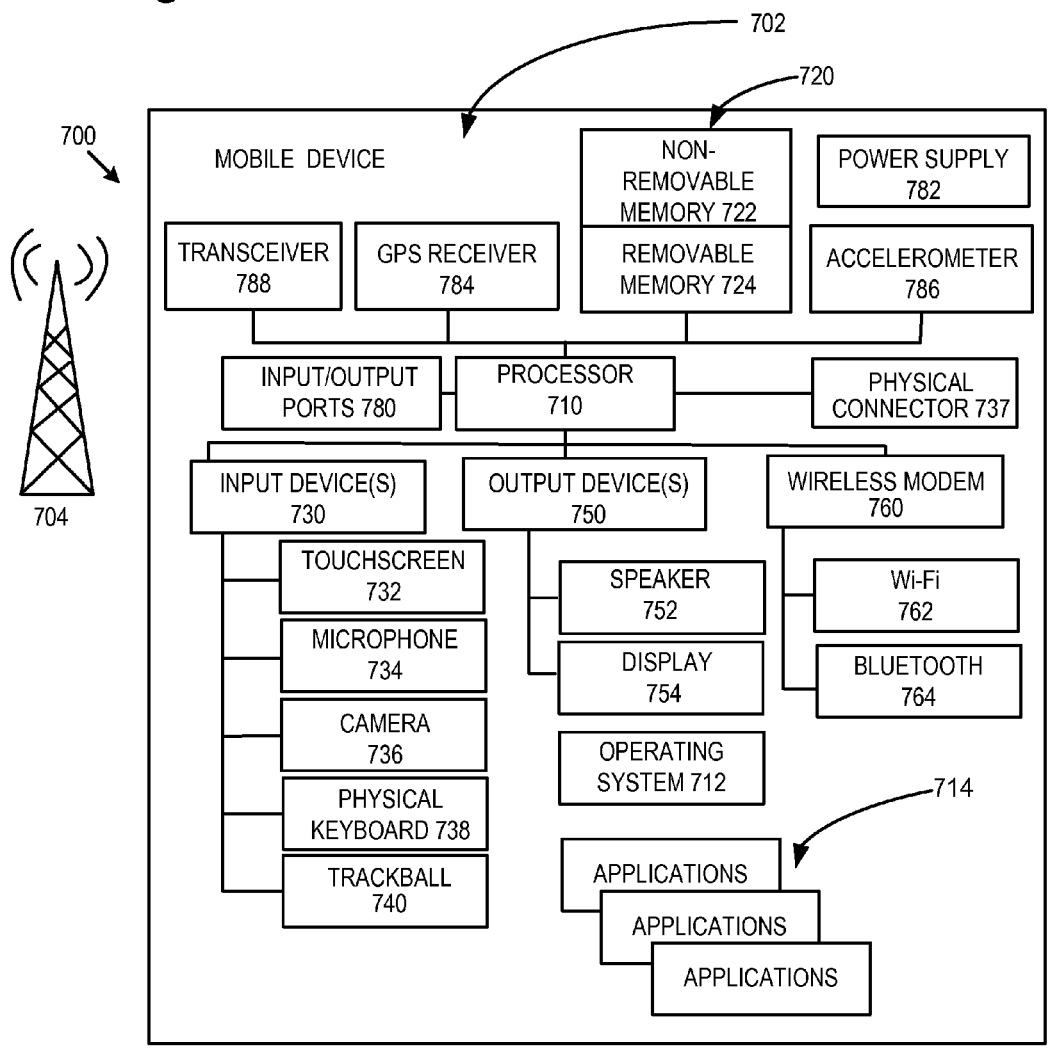
FIG. 7 is a block diagram showing example mobile device detail.

FIG. 7 depicts a detailed example of a mobile device 700 capable of implementing the techniques and solutions described herein. The mobile device 700 includes a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, laptop computer, notebook computer, tablet device, netbook, Personal Digital Assistant (PDA), camera, video camera, etc.) and can allow wireless two-way communications with one or more mobile communications networks 704, such as a Wi-Fi, cellular, or satellite network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications), or any other computing application.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touch screen 732, microphone 734, camera 736 (e.g., capable of capturing still pictures and/or video images), physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touch screen 732 and display 754 can be combined in a single input/output device.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, a transceiver 788 (for wirelessly transmitting analog or digital signals) and/or a physical connector 737, which can be a USB port, IEEE 1394 (FireWire) port, and/or RS-232 port. The illustrated components 702 are not required or all-inclusive, as any components can be deleted and other components can be added.

The mobile device 700 can implement the technologies described herein. For example, the processor 710 can obtain orientation information (e.g., ax, ay, and az values) from the accelerometer 786 during capture of pictures or video images via the camera 736. The captured pictures or video images can be adjusted (e.g., by the processor 710) to compensate for rotation of the mobile device 700 using the orientation information. The pictures or video images can be saved (in original form or adjusted form) in the memory (722 or 724). In addition, the orientation information can be saved (e.g., in the same file as the pictures or video images, or in separate files) in the memory (722 or 724). The pictures or video images can be transmitted (e.g., streamed), in original or adjusted form, and with our without associated orientation information, via a wireless network (e.g., via the wireless modem 760 or transceiver 788).

X. Example Implementation Environment

Figure 8:
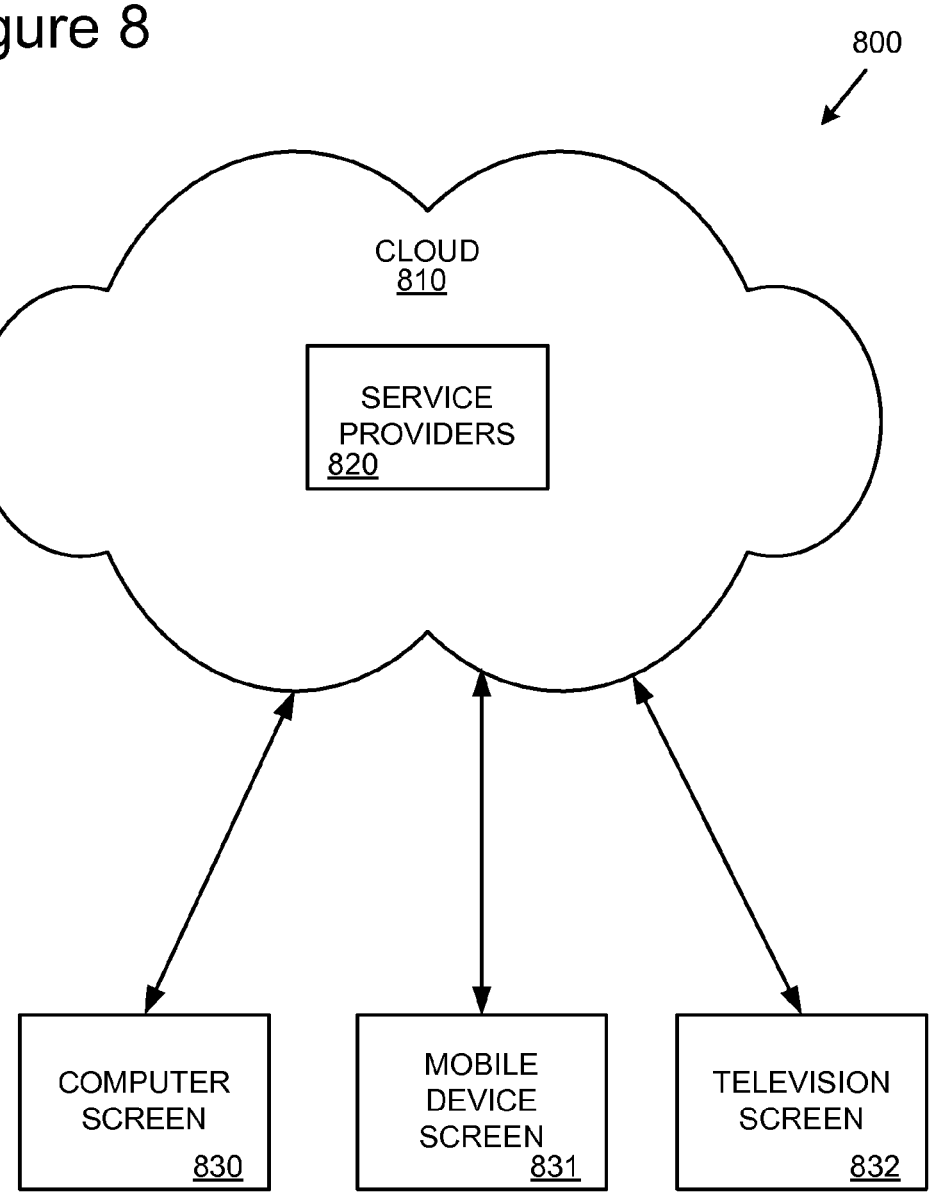
FIG. 8 is a diagram showing an example implementation environment.

FIG. 8 illustrates a generalized example of a suitable implementation environment 800 in which described embodiments, techniques, and technologies may be implemented.

In example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830-832) while other tasks (e.g., storage of data to be used in subsequent processing) can be performed in the cloud 810.

In example environment 800, the cloud 810 provides services for connected devices 830-832 with a variety of screen capabilities. Connected device 830 represents a device with a computer screen (e.g., a mid-size screen). For example, connected device 830 could be a personal computer such as desktop computer, laptop, notebook, netbook, or the like. Connected device 831 represents a device with a mobile device screen (e.g., a small size screen). For example, connected device 831 could be a mobile phone, smart phone, personal digital assistant, tablet computer, and the like. Connected device 832 represents a device with a large screen. For example, connected device 832 could be a television screen (e.g., a smart television) or another device connected to a television (e.g., a set-top box or gaming console) or the like. One or more of the connected devices 830-832 can include touch screen capabilities. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touch screen capability of a particular connected device (e.g., connected devices 830-832).

In example environment 800, the cloud 810 provides the technologies and solutions described herein to the various connected devices 830-832 using, at least in part, the service providers 820. For example, the service providers 820 can provide a centralized solution for various cloud-based services. The service providers 820 can manage service subscriptions for users and/or devices (e.g., for the connected devices 830-832 and/or their respective users).

For example, a connected device, such as device 831, comprising a camera and an accelerometer, can obtain digital pictures or video images and associated orientation information. The connected device 831 can transmit pictures or images and associated orientation information to other connected devices (e.g., 830-832), or to service providers 820 (e.g., for display or storage). Service providers 820 can perform various image processing tasks using received picture/image data and associated orientation information (e.g., adjust images to compensate for device rotation using the orientation information, match interest points in adjusted images, perform stitching operations with adjusted images, and distribute the images to other connected devices; or, to adjust images to compensate for device rotation using the orientation information, then distribute the images to other connected devices).

XI. Example Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. We therefore claim as our invention all that comes within the scope and spirit of these claims.

We claim:

1. A method, implemented at least in part by a computing device, for capturing and processing video data, the method comprising:
   for each of a plurality of video images:
      obtaining, by the computing device, orientation information of the computing device at a time of capturing the video image, wherein the computing device comprises a three-axis accelerometer, and wherein the orientation information is obtained from the three-axis accelerometer;
      adjusting, by the computing device, the captured video image based on the orientation information, wherein the adjusting the captured video image based on the orientation information comprises:
         obtaining a reference orientation that is an orientation of an initial video image of the video data; and
         adjusting the video image in real-time to return the video image to the reference orientation; and
      outputting, by the computing device, for display the adjusted captured video image;
      wherein the obtaining, adjusting, and outputting are performed in real-time during recording of the plurality of video images by the computing device.

2. The method of claim 1 wherein the orientation information comprises:
   a first value representing acceleration along an x-axis of the computing device;
   a second value representing acceleration along a y-axis of the computing device; and
   a third value representing acceleration along a z-axis of the computing device.

3. The method of claim 1 wherein the adjusting the captured video image based on the orientation information comprises compensating for a difference between the obtained orientation information for the captured video image and a reference orientation.

4. The method of claim 1 wherein the adjusting the captured video image based on the orientation information comprises:
   calculating a rotation angle in a first plane using the orientation information for the captured video image;
   determining a difference in rotation angle between the calculated rotation angle in the first plane and a reference rotation angle in the first plane; and
   adjusting the captured video image to compensate for the difference in rotation angle.

5. The method of claim 1 wherein the adjusting the captured video image based on the orientation information comprises:
   calculating a rotation angle in a first plane using the orientation information for the captured video image;
   calculating a rotation angle in a second plane using the orientation information for the captured video image, wherein the first plane is different from the second plane;
   determining a difference in rotation angle between the calculated rotation angle in the first plane and a reference rotation angle in the first plane;
   determining a difference in rotation angle between the calculated rotation angle in the second plane and a reference rotation angle in the second plane; and
   adjusting the captured video image to compensate for the difference in rotation angle in the first plane and the difference in rotation angle in the second plane.

6. The method of claim 1 further comprising:
   for each of the plurality of video images:
      storing, by the computing device, the adjusted captured video image.

7. The method of claim 6 further comprising:
   for each of the plurality of video images:
      storing, by the computing device, the orientation information associated with the stored adjusted captured video image, wherein the orientation information is stored as plural values representing acceleration along axes of the computing device or as plural rotation angles for the computing device.

8. The method of claim 1 wherein the reference orientation includes an arbitrary roll value, wherein the plurality of video images are captured subsequent to the initial video image, and wherein the adjusting the video image, for each of the plurality of subsequent video images, comprises:
   determining a difference between the arbitrary roll value of the reference orientation and a roll value of the subsequent video image; and
   adjusting the subsequent video image in real-time, based on the difference, to match the arbitrary roll value of the reference orientation.

9. A mobile device for capturing and processing video data, the mobile device comprising:
   an accelerometer;
   storage;
   a digital camera; and
   a processing unit, wherein the processing is configured for performing operations comprising:
      for each of a plurality of video images:
         obtaining, by the processing unit from the accelerometer, orientation information of the mobile device that indicates orientation of the mobile device at a time of capturing the video image;
         adjusting the captured video image in real-time based on the orientation information, wherein the adjusting the captured video image based on the orientation information comprises:
            obtaining a reference orientation that is an orientation of an initial video image of the video data; and adjusting the video image in real-time to return the video image to the reference orientation;

storing, by the processing unit in the storage, the adjusted captured video image and the orientation information, wherein the orientation information is associated with its respective captured video image;

streaming the obtained orientation information and the adjusted captured video image from the mobile device to a network server.

10. The mobile device of claim 9 wherein the plurality of captured video images are stored in a first data file, and wherein the orientation information is stored in a second data file different than the first data file.

11. The mobile device of claim 9 wherein the accelerometer is a three-axis accelerometer, wherein the plurality of captured video images and the orientation information are stored in the same data file, and wherein the orientation information is stored as plural values representing acceleration along axes of the computing device or as plural rotation angles for the computing device.

12. The mobile device of claim 9 wherein the accelerometer is a three-axis accelerometer, and wherein the orientation information comprises:

a first value representing acceleration along an x-axis of the mobile device;

a second value representing acceleration along a y-axis of the mobile device; and a third value representing acceleration along a z-axis of the mobile device.

13. One or more computer-readable storage media, wherein the one or more computer-readable storage media are one or more of volatile memory, non-volatile memory, optical storage media, and magnetic storage media, storing computer-executable instructions for causing a computing device to perform a method for capturing and processing video data, the method comprising:

for each of a plurality of video images:

obtaining orientation information of the computing device at a time of capturing the video image, the computing device comprising a three-axis accelerometer, and the orientation information being obtained from the three-axis accelerometer, wherein the obtained orientation information is a reference orientation of an initial video image of the video data;

adjusting the captured video image based on the orientation information to return the captured video image to the reference orientation of the initial video image, the adjusting comprising:

calculating a rotation angle in a first plane using the orientation information for the captured video image;

calculating a rotation angle in a second plane using the orientation information for the captured video image, wherein the first plane is different from the second plane;

determining a difference in rotation angle between the calculated rotation angle in the first plane and a reference rotation angle in the first plane;

determining a difference in rotation angle between the calculated rotation angle in the second plane and a reference rotation angle in the second plane; and applying an affine transformation to the captured video image using the difference in rotation angle in the first plane and the difference in rotation angle in the second plane; and outputting for display the transformed captured video image;

the obtaining, adjusting, and outputting being performed in real-time during recording of the plurality of video images by the computing device.

14. The one or more computer-readable storage media of claim 13 wherein the orientation information comprises:

a first value representing acceleration along an x-axis of the computing device;

a second value representing acceleration along a y-axis of the computing device; and a third value representing acceleration along a z-axis of the computing device.

15. The one or more computer-readable storage media of claim 13 wherein the applying an affine transformation comprises compensating for a difference between the obtained orientation information for the captured video image and the reference orientation.

* * * * *